United States Patent [19]
de Gennes

[11] 3,974,903
[45] Aug. 17, 1976

[54] RESILIENT TORSION DAMPENERS FOR CLUTCH DISCS

[75] Inventor: Marie Alfred Gérard de Gennes, Senlis, France

[73] Assignee: Societe Anonyme Francaise du Ferodo, Paris, France

[22] Filed: Feb. 7, 1974

[21] Appl. No.: 440,368

[30] Foreign Application Priority Data
Feb. 12, 1973 France.............................. 73.04805

[52] U.S. Cl.......................................... 192/106.2
[51] Int. Cl.².......................................... F16D 3/14
[58] Field of Search..................... 192/106.1, 106.2; 64/27 C, 27 F

[56] References Cited
UNITED STATES PATENTS

| | | | |
|---|---|---|---|
| 2,028,951 | 1/1936 | Reed................................ | 192/106.2 |
| 2,437,537 | 3/1948 | Kelleher......................... | 192/106.2 |
| 3,762,521 | 10/1973 | Dotter............................. | 192/106.2 |
| 3,817,362 | 6/1974 | Rist................................. | 192/106.1 |

*Primary Examiner*—Benjamin W. Wyche
*Attorney, Agent, or Firm*—Young & Thompson

[57] ABSTRACT

The present invention relates to torsion-damping devices for coupling two members together for rotation with an elastically-damped relative angular oscillation, one member comprising a central plate provided with passage means while the other member comprises a plurality of lateral plates disposed on each side of said central plate and coupled together by cross-braces adapted to pass through said passage means with an angular play which defines the amplitude of said oscillations in both directions of rotation, windows being formed opposite each other in said lateral plates so as to receive torsion-damping means such as springs for coupling the central and lateral plates together for rotation while offering an elastic resistance to said oscillations, said passage means being each provided with a circumferential extension sufficient to permit the corresponding cross-brace to penetrate, at least partially, into the overall contour of the nearest windows of said central plate, said overall contour being defined as that which radially and circumferentially envelops the corresponding spring when said damping device is in the position of rest.

11 Claims, 13 Drawing Figures

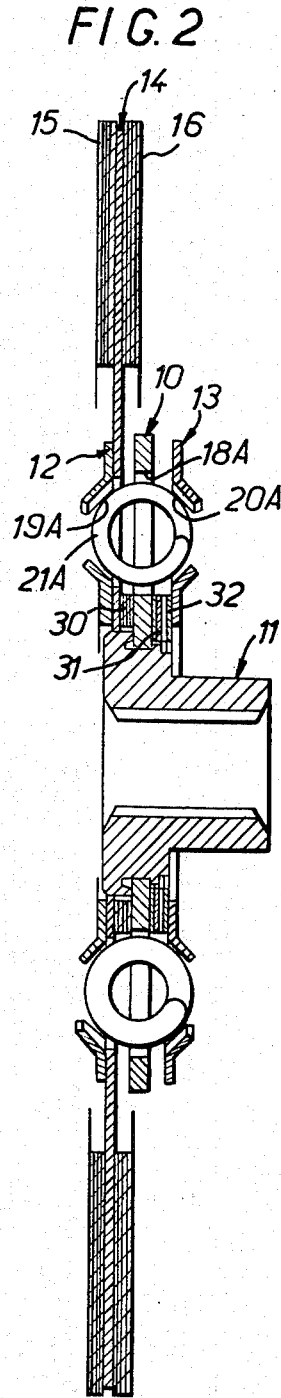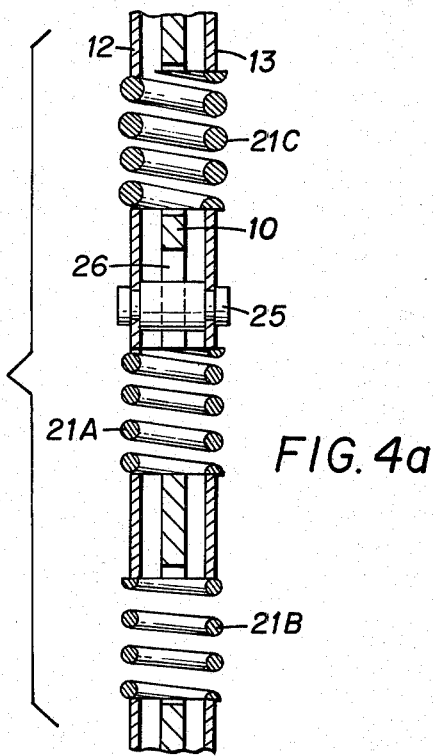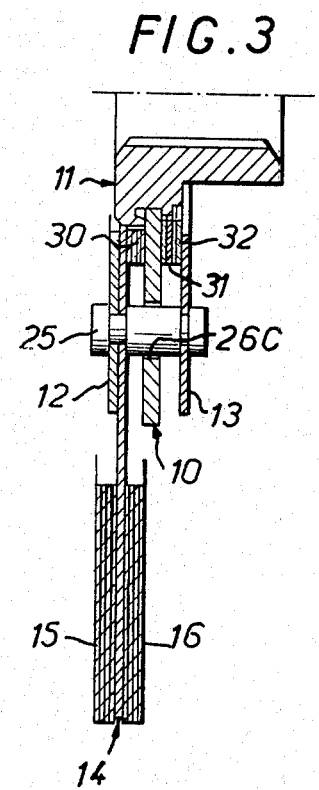

RESILIENT TORSION DAMPENERS FOR CLUTCH DISCS

The present invention relates generally to torsion-damping devices ensuring the coupling between two parts in rotation with a relative angular oscillation braked elastically, and is more particularly directed to those torsion-damping devices in which one of the said parts comprises a central plate provided with passage means, while the other part comprises lateral plates which are arranged on each side of the central plate, and which are interconnected by cross-braces passing through the said passage means with an angular clearance defining the said oscillation in both directions, windows arranged facing each other in the said plates receiving torsion-damping means such as springs or other elastic means which ensure the coupling together of the plates in rotation, while offering an elastic resistance to the relative angular oscillation of these plates.

Torsion-damping devices of this kind are especially employed in the assembly of clutch friction discs, especially for automobile vehicles.

One of the problems to be solved during the production of these torsion-damping devices arises from the necessity of ensuring an adequate mechanical performance of the plates which they comprise, in particular for the central plate, in spite of the many openings, windows, notches or other passages with which they are provided for the mounting of the torsion-damping devices, and also for the mounting and the passage of the cross-braces which couple together the two lateral plates.

In order to reduce the relative influence of the passage means provided for the said cross-braces on the weakening which they cause in the mechanical strength of the central plate which comprises these passage means, it has already been proposed to cause these latter to open into the windows provided in this central plate for the housing of the torsion-damping springs.

However, in the constructions of this type known at the present time, these passage means actually constitute extensions of the said windows towards the axis of the assembly, that is to say in a direction of reduced diameter in which the material available is a minimum and in which therefore any removal of material becomes excessive.

The present invention has especially for its object a torsion-damping device which, while avoiding this removal of material in the radial direction, and while retaining the advantages of the arrangement by which the passage means provided for the cross-braces connecting together the lateral plates are extensions of the windows of the central plate, further permits larger angles of relative angular oscillation to be obtained without thereby affecting the central plate.

The present invention also has for its object a friction disc for a clutch equipped with a torsion-damping device of the kind referred to.

The damping device according to the invention is of the type briefly described above, and is generally characterized in that the passage means provided for the cross-braces which couple together the lateral plates have a sufficient circumferential extent for the said cross-braces to be able, when so desired at least partially, to penetrate into the overall contour of the nearest windows, the said overall contour being defined as radially and circumferentially enveloping the corresponding spring when the damping device is at rest.

Following a first form of embodiment, these passage means are constituted by circumferential extensions of at least some of the windows of the central plate, these extensions being preferably started from the central zone of one of the radial edges of the corresponding windows.

These circumferential extensions may be closed at one of their extremities and may either extend in the same circumferential direction starting from the windows from which they initiate, or they may extend in pairs in both circumferential directions on each side of the same window.

In an alternative form, these circumferential extensions may extend from one window to another.

According to a second form of embodiment, the passage means provided for the cross-braces coupling together the lateral plates, penetrate into the windows of the central plates which are nearest and are there delimited by partitions having the shape of a glove finger.

However this may be, these passage means are always formed in a zone of mean radius of the central plate, that is to say in a zone of this plate in which the space available is relatively large and in which therefore removal of material is relatively easy to carry out and remains without substantial consequence on the mechanical strength.

In addition, the passage means according to the invention permit the cross-braces which pass through them to move also in the part of the windows of the central plate left free by the corresponding springs during the angular oscillation of this central plate with respect to the lateral plates, which, all other things being equal, makes it possible advantageously to give this oscillation a greater angular development, and this result is therefore obtained without reducing the mechanical strength of the parts concerned, and without modifying the characteristics of the transmitted torque.

Furthermore, by this possibility which it offers of increasing the angular oscillation, this arrangement advantageously facilitates the adoption of cross-braces having a circumferentially elongated section, for an equal section of metal, such cross-braces having with advantage a smaller radial dimension.

The characteristic features and advantages of the invention will furthermore be brought out in the description which follows below, given by way of example, reference being made to the accompanying diagrammatic drawings, in which:

FIG. 2 is a view in axial section of this disc taken along the broken line II—II of FIG. 1;

FIG. 3 is a half-view in axial section of this disc taken along the line III—III of FIG. 1;

FIG. 4a is a fragmentary arcuate cross-sectional view taken on FIG. 4;

Figure 1:
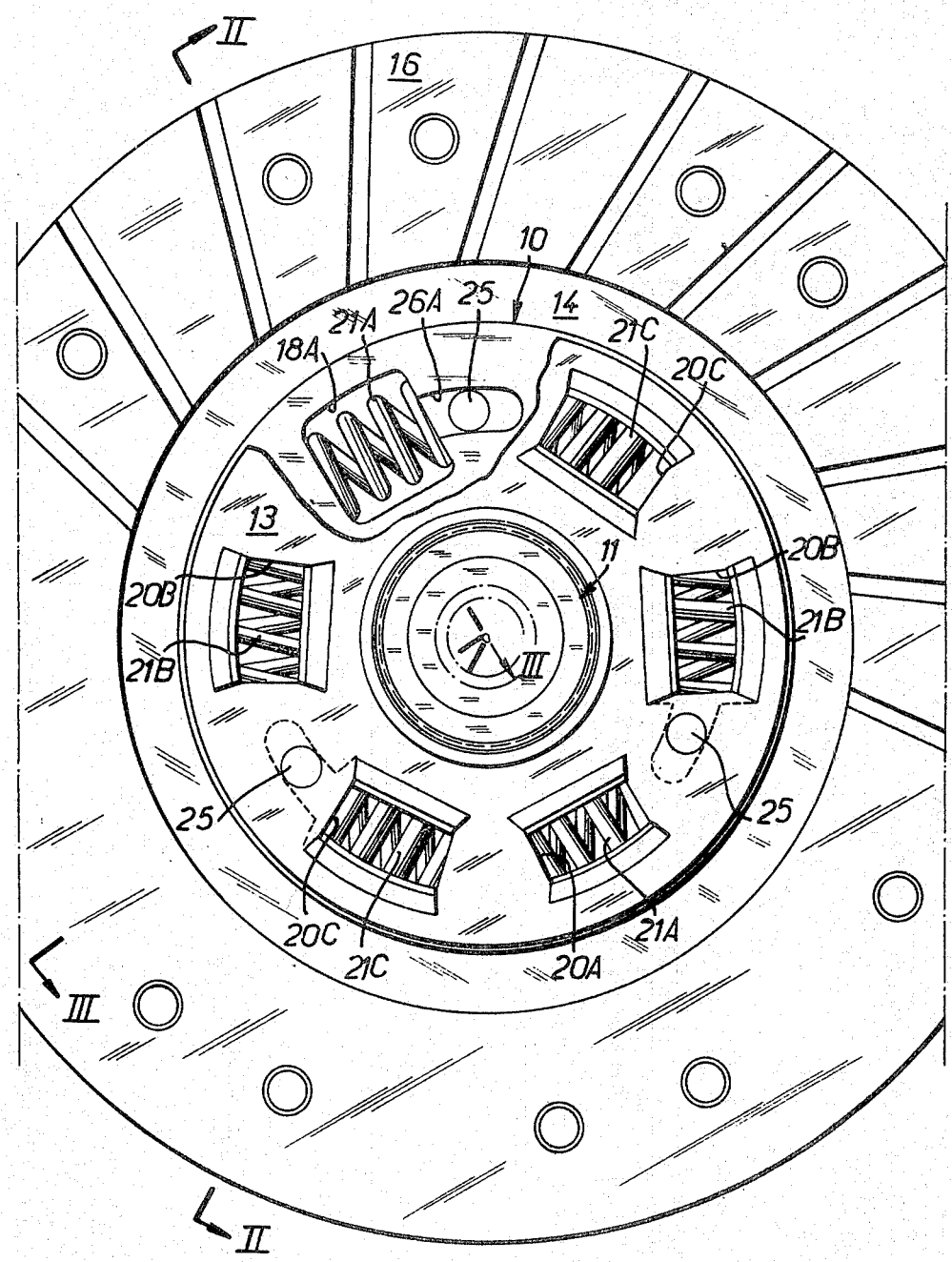
FIG. 1 is a view in elevation with parts broken away, of a clutch friction disc comprising a torsion-damping device in accordance with the invention.

The above drawings illustrate by way of example the application of the invention to the construction of a clutch friction disc, especially for an automobile vehicle.

According to the form of construction illustrated in FIGS. 1 to 6, this clutch friction disc comprises a central annular plate 10 rigidly fixed on a central hub 11 and lateral annular plates 12, 13 mounted on each side of the central plate 10 and rigidly fixed to an annular plate 14 of larger diameter carrying friction linings 15, 16 on each side of its periphery.

Windows 18A, 18B and 18C arranged in a circular row are formed in the plate 10; these are six in number in the example shown in FIGS. 1 to 6.

Windows 19A, 19B and 19C, and 20A, 20B and 20C, also arranged in a circular row, are formed respectively in the lateral plate 12 and in the lateral plate 13, in correspondence with the window 18A, 18B or 18C of the central plate 10.

In the various windows 18, 19, 20A etc. facing each other are mounted torsion-damping springs 21A, 21B and 21C provided for elastically coupling together in rotation the hub 11 and the friction linings 15, 16.

According to an arrangement which is known in itself, the angular openings of the windows 18A, 19A, 20A etc. are different in order to permit the springs 21A etc. to come into action at different moments during the course of a relative angular displacement of the hub 11 with respect to the friction linings 15, 16.

For example, and as shown in FIGS. 1 to 6, there is a first set of two diametrically-opposite springs 21A, for which the angular opening of the windows 18A of the central plate 10 is equal to that of the corresponding windows 19A, 20A of the lateral plates 12, 13.

Figure 4:
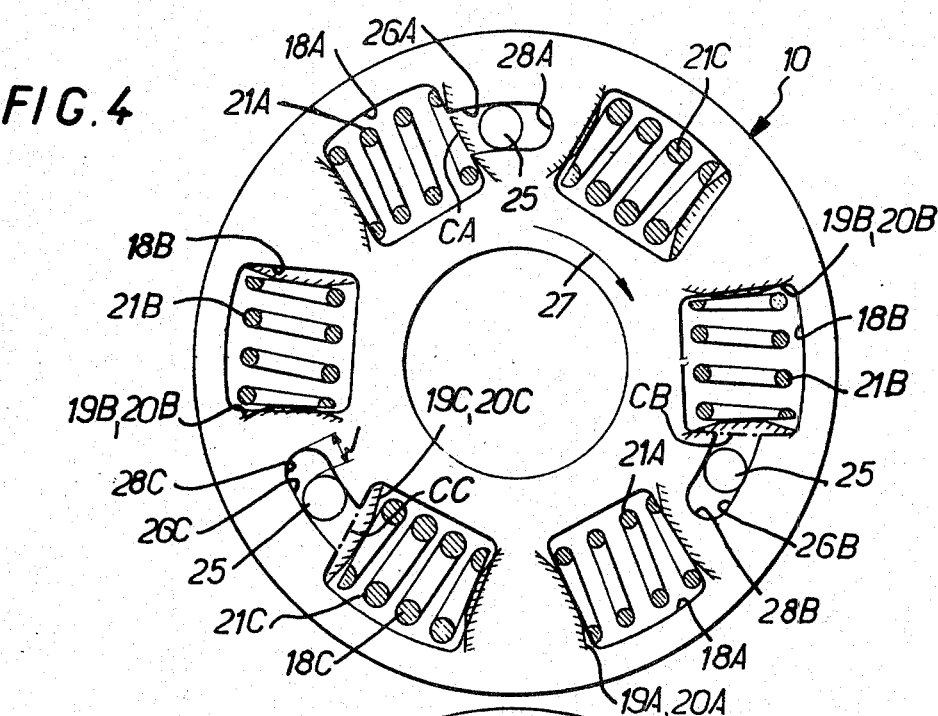
FIG. 4 is a view in elevation of the single central plate of this friction disc, the associated springs being shown in cross-section and the friction disc being assumed to be at rest.

For the sake of clearness of the drawing, these windows 19A, 20A have only been shown diagrammatically in FIG. 4 by a part of their radial edges, this part being shown shaded.

For a second set of two diametrically-opposite springs 21B, the angular opening of the corresponding windows 18B of the central plate 10 is greater than the angular opening of the windows 19B, 20B corresponding, of the lateral plates 12, 13.

The same thing is true for a third set of two diametrically-opposite springs 21C, the difference between the angular openings of the windows 18C on the one hand, and 19C, 20C on the other being greater than that corresponding, existing for the springs 21B.

In a manner known per se, the lateral plates 12, 13, are interconnected by cross-braces or small pillars 25 which pass through passage means provided for that purpose in the central plate 10 and which also ensure the fixing of the plate 12 to the plate 14 which carries the friction linings.

According to the invention, and in conformity with the form of construction shown, these passage means are constituted by circumferential extensions 26A etc. of at least some of the windows 18A etc. of the central plate 10.

In the example shown in FIGS. 1 to 6, these small pillars are three in number and are uniformly distributed circularly.

Preferably, and as shown, these circumferential extensions are each appropriated to one of the windows 18A etc. of each of the three sets of springs 21A, 21B, 21C.

There is thus a circumferential extension 26A of a window 18A, a circumferential extension 26B of a window 18B and a circumferential extension 26C of a window 18C, these circumferential extensions being distributed at 120° with respect to each other.

In the example shown, they all extend in the same circumferential direction, indicated by the arrow 27 of FIG. 4, and are all initiated from the central zone of the corresponding radial edge of the window 18A etc. with which they are associated.

Also in the example shown, these circumferential extensions 26A, 26B, 26C are all closed by a semi-circular bottom 28A, 28B, 28C, respectively.

Furthermore, and in a manner known per se, a friction washer 30 is intercalated between the central plate 10 and the plate 14 associated with the lateral plate 12. Similarly, a friction washer 31 is interposed between the central plate 10 and the lateral plate 13, with a corrugated washer 32 which ensures the elastic adjustment of the assembly.

Figure 5:
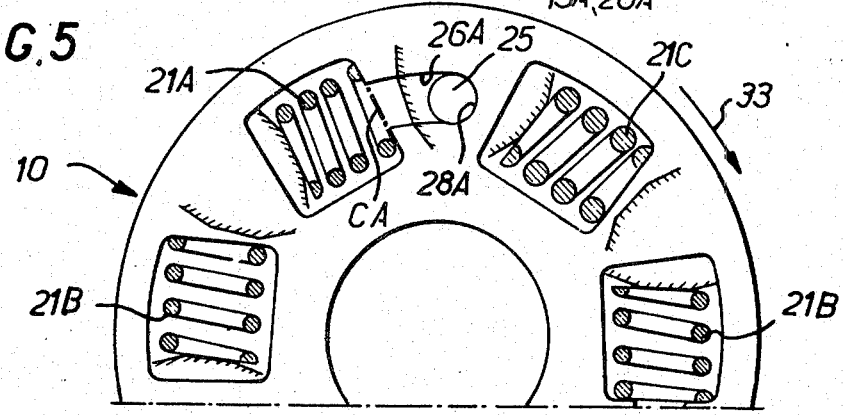
FIGS. 5 and 6 are partial views similar to that of FIG. 4, and illustrate the operation of the friction disc, for the direct sense of rotation of this disc with respect to FIG. 5, and the reverse sense with respect to FIG. 6.

In the position of rest, as shown in FIG. 4, a clearance J subsists between the cross-braces 25 and the bottom 28 of the circumferential extensions 26A etc. in which they can oscillate during a drive in the forward direction of the friction linings 15, 16 and therefore of the lateral plates 12, 13, following for example the arrow 33 of FIG. 5. There is a rotational drive of the central plate 10 and therefore of the hub 11 by the springs 21A etc., the springs 21A being the first to come into action followed by the springs 21B and finally the springs 21C, taking account of the angular displacements between the windows in which these springs are housed, as previously explained.

A procedure of this kind is well known per se, and will not be dealt with in detail later.

It will only be necessary to note from FIG. 5, that if the cross-braces 25 come into contact with the bottoms 28 of the circumferential extensions 26A etc. in which they are engaged, there is then a direct drive of the central plate 10 by the cross-braces. In FIG. 5 there is only shown the contact of a cross-brace with the bottom 28A of the circumferential extension 26A.

Figure 6:
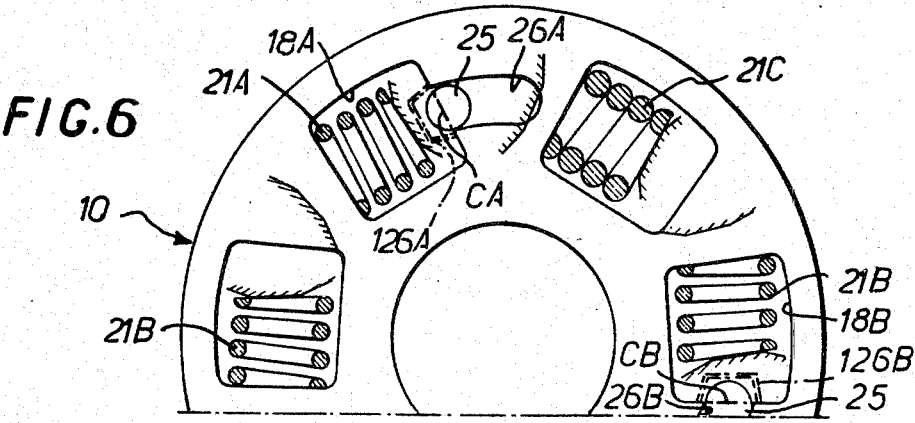

For the opposite direction of rotation shown in FIG. 6, this direct drive is ensured, not by a cross-brace 25 but by the springs 21C, the turns of which have then come into mutual contact.

It will have been noted that if a broken line CA, CB, CC is given in the drawings to the overall contour of the windows 18A, 18B, 18C of the central plate 10 into which open the passages 26A, 26B, 26C, this overall contour being defined as enveloping radially and circumferentially the corresponding springs 21A, 21B, 21C when the damping device is at rest, the cross-braces 25 penetrate at least partially into the said contour CA, CB, CC during the angular oscillation of the central plate 10, as shown in FIG. 6. For such a position of rest of the damping device, it is obvious that at least some of the springs concerned may be under load.

Thus, according to the invention, the passage means provided for the cross-braces 25 have a circumferential extension sufficient for the said cross-braces to be able to penetrate into the overall contour of the nearest windows of the central plate 10, which, the conditions being equal, enables the possible angular extension of the relative angular clearance of this central plate to be increased with respect to the lateral plates 12, 13.

In the example shown in full lines in FIGS. 1 to 6, these passage means really open into the corresponding nearest windows of the central plate 10.

According to an alternative form shown diagrammatically in broken lines in FIG. 6 only, these passage means 26A, 26B, 26C penetrate into the windows 18A, 18B, 18C but are delimited there by the partitions shaped like glove fingers 126A, 126B, 126C, on which the springs 21A, 21B, 21C are engaged when at rest. The partition 126C cannot be seen on FIG. 6.

Figure 7:
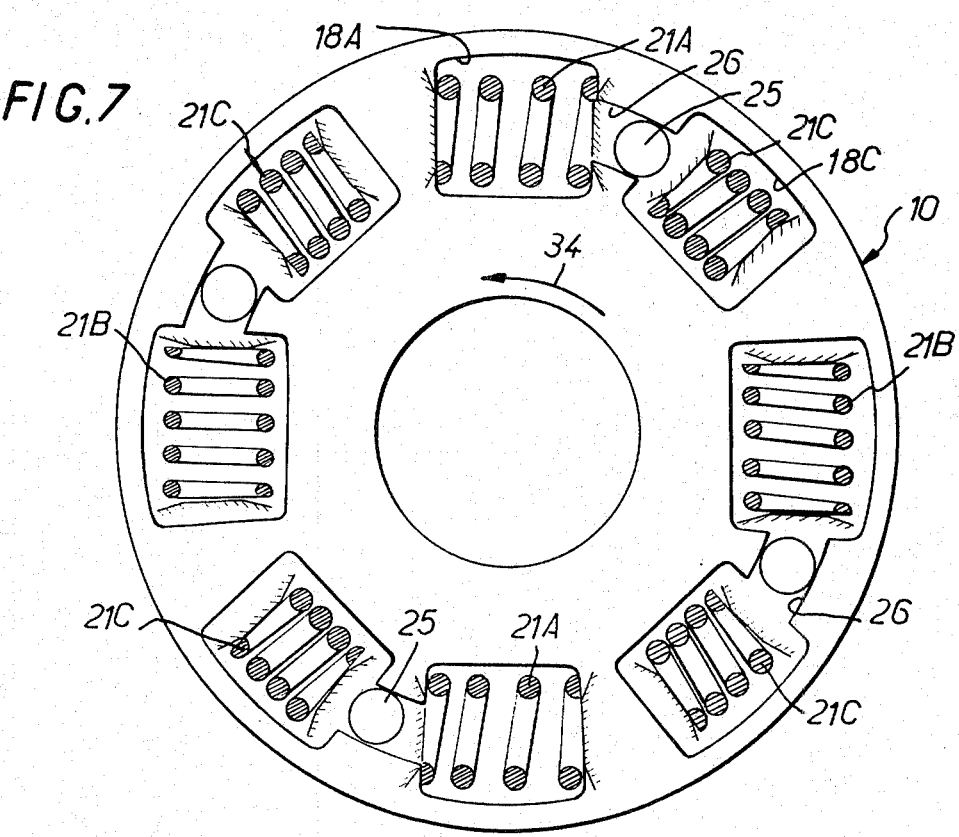
FIGS. 7 to 9 are views respectively similar to those of FIGS. 4 to 6 and relate to an alternative form of construction.
Figure 8:
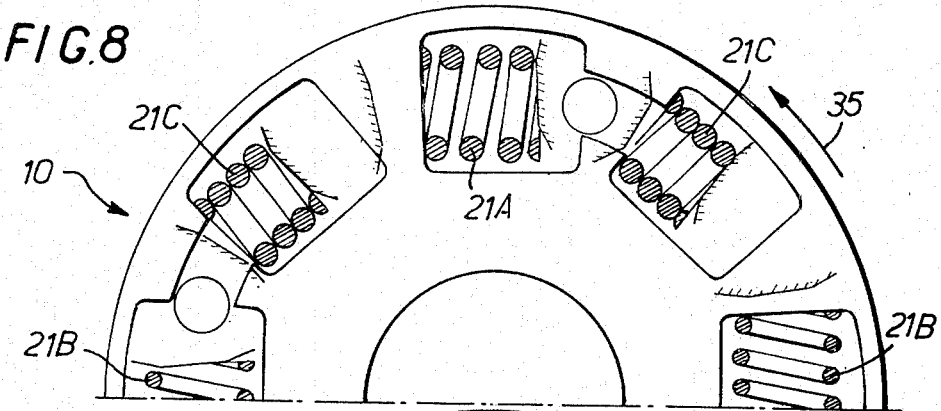
Figure 9:
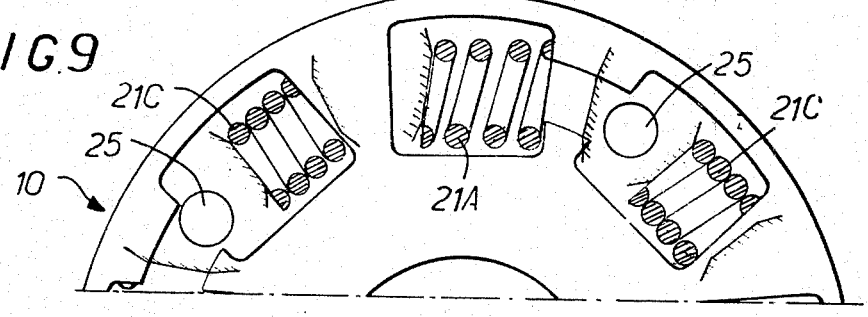

In the alternative form of construction shown in FIGS. 7 to 9, there are, as previously, three sets of springs 21A, 21B, 21C.

The springs 21A which are two in number, and the springs 21B which are also two in number, are circularly imbricated at 90°.

The springs 21C are four in number and are circularly interposed between the previous springs 21A and 21B.

In this form of construction, the circumferential extensions of the corresponding windows 18A etc. of the central plate 10 provided according to the invention for the passage of the cross-braces 25, extend from one of these windows to the other.

In the example shown, there are thus four passages 26 each of these extending from one window 18C to the window 18A or 18B which is nearest, for the same circumferential direction, for example that indicated by the arrow 34 of FIG. 7.

In a form of construction of this kind, the cross-braces 25 are no longer able to ensure the direct drive of the central plate 10.

For the forward direction of rotation, indicated by the arrow 35 in FIG. 8, this direct drive is effected by the springs 21C, the turns of which are then all in contact; this is also true for the reverse direction of rotation, as illustrated by FIG. 9.

Figure 10:
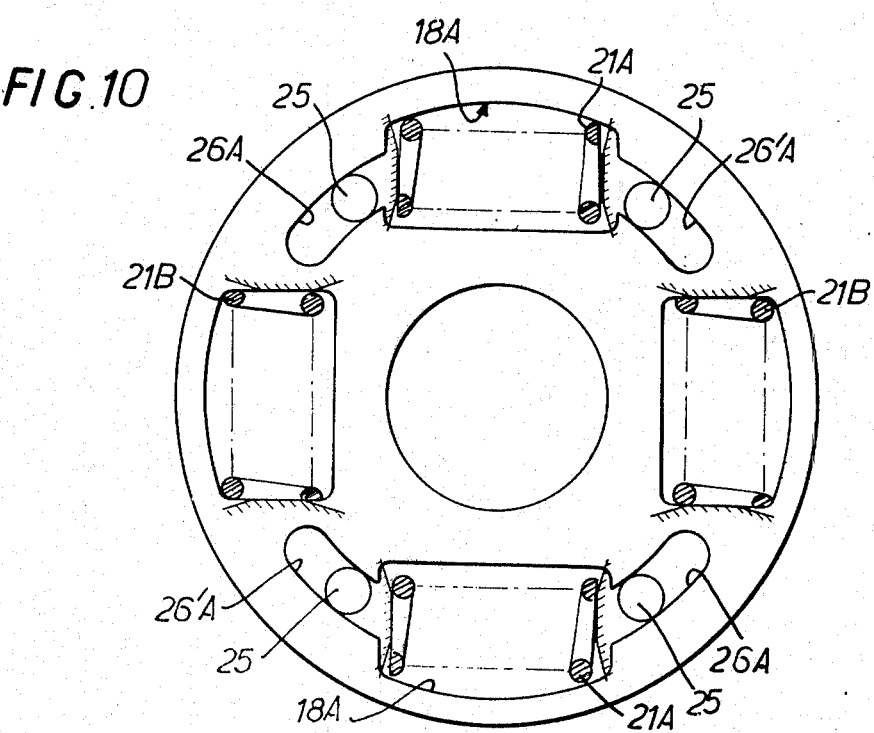
FIGS. 10 to 12 are also views respectively similar to those of FIGS. 4 to 6 and are concerned with another alternative form of construction.
Figure 11:
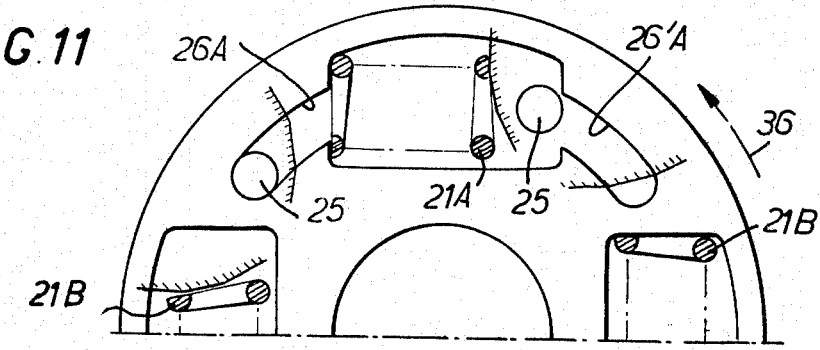
Figure 12:
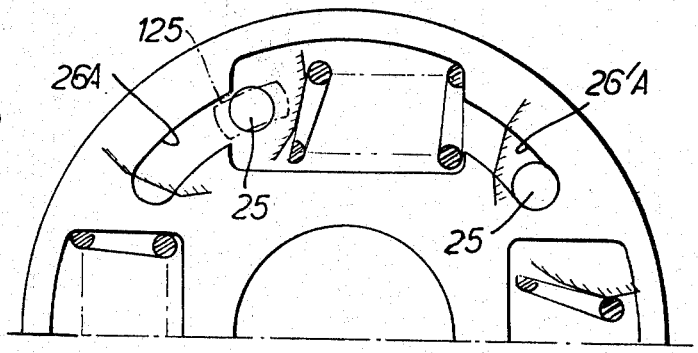

According to the form of construction shown in FIGS. 10 to 12, there are two diametrically-opposite springs 21A and two also diametrically-opposite springs 21B circularly imbricated at 90° with the previous springs.

The circumferential extensions 26A etc. provided according to the invention for the passage of the cross-braces 25 extend in this case in pairs in both circumferential directions on each side of the same window.

In the example shown, there are thus two circumferential extensions 26A, 26'A starting from each window 18A, on each side of such a window, the cross-braces 25 being four in number.

For the forward direction of rotation shown by an arrow 36 in FIG. 11, two of the cross-braces 25 are capable of ensuring the direct drive of the central plate 10 by coming into abutment against the bottoms of the corresponding circumferential extensions in which they are engaged.

For the reverse direction of rotation, as shown in FIG. 12, it is the other two cross-braces 25 which can come into abutment against the bottom of the corresponding circumferential extensions 26'A.

In the embodiment described above, the cross-braces 25 have a circular contour section.

According to the alternative form shown diagramatically at 125 in broken lines for one of these cross-braces shown in FIG. 12, the section of the cross-brace may be extended circumferentially, and for example may be radially delimited by two parallel edges, for the same section of metal; this arrangement, having the advantage of the possibility of greater angular clearance, gives the cross-braces 25 a smaller radial dimension.

The present invention is of course not limited to the forms of embodiment described and shown, but includes any alternative form of construction and/or of combination of their various parts.

What I claim is:

1. A damping device coupling and allowing limited relative angular displacement of two parts, comprising a first part including a central plate with passage means, a second part including a lateral plate on each side of said central plate and pin means interconnecting said lateral plates and passing through said passage means, said passage means defining clearance in both directions of relative angular displacement of said pin means from said rest position, generally rectangular windows in said central plate substantially in registration in said rest position with generally rectangular windows in said lateral plates, said windows including a pair of opposed, generally radial sides and a pair of opposed, generally circumferential sides, resilient damping means being confined circumferentially by said windows, coupling said plates for rotation, and resisting relative angular displacement of said plates, said passage means extending circumferentially and opening onto said generally radial sides of at least some of said windows in the central plate, the path of limited angular displacement of said pin means including said passage means and a portion inside the overall configuration of each of the last-mentioned windows and within the spaced occupied by the resilient damping means in said last-mentioned windows in said rest position whereby said pin means enters into a portion of said last-mentioned windows which was occupied in said rest position by a portion of said resilient damping means.

2. A damping device according to claim 1, wherein said portions of the path of limited angular travel of said pin means effectively inside said last mentioned windows are finger-shaped and re-entrant with respect to the overall configuration of said last-mentioned windows.

3. A damping device according to claim 1, wherein said passage means are closed at their respective ends remote from said last-mentioned windows onto which they open.

4. A damping device according to claim 1, wherein there are a plurality of sets of resilient damping means, said passage means being associated with at least one said window in the central plate corresponding to each of said sets of damping means.

5. A damping device according to claim 1, wherein one of said parts includes a hub and the other said part is provided with friction linings.

6. A damping device according to claim 5, wherein said first part includes a hub and said other part is provided with friction linings.

7. A damping device according to claim 1, wherein said pin means have a circumferentially elongated section.

8. A damping device according to claim 1, wherein passage means extend circumferentially from and open onto each of said opposed generally radial sides of at least one of said last-mentioned windows.

9. A damping device according to claim 3, wherein said passage means extend circumferentially from and open onto each of said opposed, generally radial sides of said last mentioned windows.

10. A damping device according to claim 1, wherein each passage means is common to a circumferentially adjacent pair of said last-mentioned windows, said passage means opening onto the radial sides of said adjacent pair of windows facing each other.

11. A damping device according to claim 1, wherein said passage means open through the centers of said radial sides of said windows.

* * * * *